United States Patent

[11] 3,626,027

| [72] | Inventors | Atsushi Tanaka;<br>Hideo Sawada; Hirotaka Toba, all of<br>Iruma-gun, Japan |
|---|---|---|
| [21] | Appl. No. | 749,947 |
| [22] | Filed | Aug. 5, 1968 |
| [45] | Patented | Dec. 7, 1971 |
| [73] | Assignee | Daicel Limited |
| [32] | Priority | Aug. 4, 1967 |
| [33] | | Japan |
| [31] | | 42/50104 |

[54] PROCESS FOR PRODUCING A GRAFT COPOLYMER COMPOSITION HAVING A POLYETHER AS ONE COMPONENT
2 Claims, No Drawings

[52] U.S. Cl. ................................................ 260/874,
260/33.6 UA, 260/33.8 UA, 260/887, 260/897,
260/899, 260/901
[51] Int. Cl. ........................................................ C08g 43/02
[50] Field of Search ............................................. 260/874,
901

[56] References Cited
UNITED STATES PATENTS

| 1,985,993 | 1/1935 | Herrmann et al. | 260/874 |
|---|---|---|---|
| 3,346,663 | 10/1967 | Kern et al. | 260/874 |
| 3,449,272 | 6/1969 | Wismer et al. | 260/874 |
| 3,475,519 | 10/1969 | Noland et al. | 260/901 |
| 3,485,910 | 12/1969 | Kennedy | 260/874 |

Primary Examiner—Samuel H. Blech
Attorney—Woodhams, Blanchard and Flynn

ABSTRACT: A process is disclosed and claimed for producing a graft copolymer composition, (e.g., polyether). The composition is prepared by adding and mixing more than an equivalent of an aliphatic polyether polymer with a polymer having an acid ester, acid anhydride, alcohol ester or acetal or alcohol group side chain, in the presence of a solvent solution. The mixture is then heated and a Lewis acid is added under agitation.
The graft copolymer compositions are useful in molding applications.

PROCESS FOR PRODUCING A GRAFT COPOLYMER COMPOSITION HAVING A POLYETHER AS ONE COMPONENT

This invention relates to a process for producing a novel graft copolymer having a polyether as a main body and having improved properties.

As already known polyether resins, there can be enumerated such open-ring polymers a polyoxymethylene, polyethylene oxide, polypropylene oxide, polyepichlorohydrin and 3,3-bischloromethyl-oxacycloheptane. They are generally used for such uses as of plastic materials, rubber or foamed plastic raw materials surface treating agents, cosmetics, medicinal materials and packing raw materials, However, such various polyethers cannot be free from their own disadvantages. In case their development in various fields of application is considered, it is found that many more researches for their improvements and modifications are required.

As a means for such modifications and improvements, researches on the graft copolymerization are often generally made in recent years. As regards polyethers, too, there have been already suggested some processes for graft-copolymerizing a vinyl monomer in the presence of such radical catalyst as a peroxide. But they have not yet been practiced.

As a result of making various investigations on a graft copolymerization having a polyether as a main body, we have reached the present invention. That is to say, the present invention is to produce a novel graft copolymer having a polyether as one component by mixing more than an equivalent of a polyether resin with a polymer having a side chain of an acid ester, acid anhydride, alcohol ester, alcohol group (—OH) or acetal group and made, as required, an organic solvent solution and heating them to react by adding a Lewis acid catalyst under agitation in the state of a uniform solution or suspension. That is to say, the present invention is to provide a process for producing a graft copolymer by the mutual reaction of the polymers themselves of a proper trunk polymer selected from such polymer group as is mentioned above and a polyether polymer as different from a well known conventional producing process for polymerizing a proper trunk polymer by adding a monomer component forming a polyether to it.

The present invention has it as an object to produce a novel useful highly polymerized plastic composition material by providing a polyether resin with such characteristics as a thermostability, proper softness, impactproofness and, in some case, a moldability or waterproofness by using for the trunk polymer a polymer having a side chain of an acid ester, acid anhydride, alcohol ester, alcohol group or acetal group, that is, a polymer containing as at least one component such units as acrylic acid ester, methacrylic acid ester, vinyl ester, vinyl alcohol, allyl alcohol or vinyl acetal.

The reaction of the polymers themselves of a polymer having an acid ester, alcohol ester, alcohol (—OH), acid anhydride or acetal group side chain and a polyether polymer having a structure having a repeated unit of a —Cn—O— bond as a main body in the present invention is considered to proceed probably because a polymer cation produced when the Lewis acid catalyst is arranged in the polyether chain and, in some case, a part of the polyether chain is cut attacks the side chain of the above mentioned trunk polymer and causes a chain transfer called a transacetalizing reaction so that a graft copolymer may be produced.

For such trunk polymer to be used in the present invention as is mentioned above can be enumerated such various polymers as, for example, polymethyl acrylate, polyethyl acrylate, polymethyl methacrylate, polyethyl methacrylate, polyvinyl acetate, polyisopropenyl acetate, polyvinyl alcohol, polyallyl alcohol, polyvinyl formal, polyvinyl acetal, polyvinyl butylal, an ethylene-vinyl acetate copolymer, ethylene-ethyl acrylate copolymer, butadiene-methyl methacrylate copolymer, vinyl chloride-vinyl acetate copolymer, vinyl acetate-butyl acrylate copolymer, styrene-allyl alcohol copolymer and styrene-maleic anhydride copolymer. Needless to say, it is not limited to them. There can be used any vinyl polymer in the broad sense of the words containing at least 1 percent by weight of such ingredient as acrylic ester, methacrylic ester, maleic ester, fumaric ester, itaconic ester, fatty acid vinyl, vinyl alcohol, allyl alcohol, vinyl acetal or maleic anhydride.

For the graft polyether polymer ingredient to be used in the present application, there can be enumerated a high polymer having a polyacetal structure and obtained by polymerizing such aliphatic aldehyde as, for example, formaldehyde, acetaldehyde, propionaldehyde, n-butylaldehyde or chloral by well known ordinary polymerizing process and a polyether polymer obtained by the ring-opening polymerization or copolymerization of such cyclic compound as ethylene oxide, propylene oxide, butylene oxide, trioxane, 1,3-dioxolane, epichlorohydrin, tetrahydrofuran or 3,3-bischloromethyloxacyclobutane. Needless to say, it is not limited to them. Any polymers having an ether bond of —Cn—O— in the main chain skeleton are broadly included. Particularly from the viewpoint of the ease of the acquirement from the market and the ease of the adjustment of the reaction in the process of the present invention, a polyether in which n in —Cn—O— is 1 to 4 is preferable. It is desirable usually to use such polyether as made a solution in case it is soluble in the reaction system solvent or as powdered as finely as possible and uniformly dispersed and suspended in the solvent in case it is insoluble.

Further, the Lewis acid catalyst to be used in the process of the present invention is a halide of such metal as, for example, boron, aluminum, tin, titanium, antimony or iron. Particularly, among them, boron trifluoride (or its ether complex compound), aluminum chloride, aluminum bromide, titanium tetrachloride and tin tetrachloride are typical. If the amount of use of the catalyst is too small, the reaction will not proceed smoothly. On the contrary, if it is too large, the decomposition of the trunk component polymer will be remarkably accelerated. In either case, a composition having satisfactory physical properties will be hard to obtain. The amount of addition of the catalyst is usually 0.01 to 20.0 percent by weight or particularly preferably about 0.1 to 5.0 percent by weight on the total amount of the polymer.

Further, in the process of the present invention, it is desirable to use an organic solvent. But, if a strong agitation is available, such organic solvent is not always necessary. There can be used substantially any organic solvent which does not dissolve or swell the polymer used as the trunk polymer and is inert to the Lewis acid catalyst. However, such hydrocarbon halides as chloroform, dichloromethane, dichlorethane and chlorobenzene, nitrobenzene, toluene and dimethyl formamide are particularly preferable.

The reaction temperature in the process of the present invention is not particularly limited but is selected in the range of 0° to 150° C. However, the most preferable range is 30° to 70° C.

Thus the present invention is to provide a process for producing a graft copolymer composition having a polyether as one component by adding and mixing more than an equivalent of an aliphatic polyether polymer having a —Cn—O— bond in the main skeleton chain with a polymer having an acid ester, acid anhydride, alcohol ester or alcohol or acetal group side chain and made, as required, an organic solvent solution and heating them to react by adding a Lewis acid as a catalyst under agitation in the state of a uniform solution or suspension. The process of the present invention shall be explained with reference to the following examples:

EXAMPLE 1

A solution of 8 g. of polymethyl methacrylate dissolved in 120 cc. of nitrobenzene was put into an autoclave of a capacity of about 500 cc. made of glass and having an agitator and 20 g. of a finely crushed powder of a "Duracone" resin (a trade name of a polyacetal copolymer having trioxane as a main raw material and produced by Polyplastic Company, Ltd.) were added thereto and were suspended as uniformly as possible. Then 4 cc. of a boron trifluoride-diethyl ether complex compound were dropped into the suspension, the atmosphere in the autoclave was replaced with nitrogen and then the autoclave was sealed and was heated at 70° C. for 3 hours while the contents were being severely agitated. The white suspension in the system gradually became transparent and changed to be in a dissolved state. Here the reaction was stopped and a large amount of methanol containing diethyl amine was added to the product in the system. The deposited polymer was filtered, well washed and dried. When the thus obtained polymer was fractionated with chloroform, there were obtained 1.83 g. of a chloroform-insoluble fraction and 9.92 g. of a soluble fraction. When both of these fractions were analyzed with infrared absorption spectra, absorptions of a polyether and acid ester were clearly detected, particularly to be noted was that an absorption peak based on the crystallizability peculiar to polyoxymethylene was found and both fractions were confirmed to contain a graft copolymer. When this chloroform solution was flowed and expanded, a hard tough film was obtained.

EXAMPLE 2

A polymer was obtained by exactly the same operation with the apparatus in example 1 except that a toluene solution of "Levaplene 450" (a trade name of an ethylene-vinyl acetate copolymer produced by Bayer Co., West Germany) was used instead of polymethyl methacrylate. The polymer was fractionated into 6.67 g. of a toluene-insoluble fraction and 8.56 g. of a soluble fraction. When they were analyzed, it was clearly confirmed that a graft copolymer had been produced. A soft film could be made by flowing and expanding the toluene-soluble part.

EXAMPLE 3

A polymer was prepared by substantially the same process and operation as in example 1 except that a chloroform solution of polymethyl acrylate was used instead of the polymethyl methacrylate in example 1. When it was fractionated, there were obtained 5.89 g. of a chloroform-insoluble fraction and 5.69 g. of a soluble fraction. As a result of analyzing them, both fractions were confirmed to contain a graft copolymer. A soft flowed expanded film was obtained from the chloroform solution.

EXAMPLE 4

A white rather hard waxy polymer was obtained by the same operation as in example 1 with the same apparatus as in example 1 except that a chloroform solution of Carbowax–6000 (a trade name of a polyethylene glycol produced by U. C. C. Co.) was used instead of the "Duracone" resin. As a result of the same analysis as is mentioned above, the production of a graft copolymer was confirmed.

What we claim is:

1. A process for producing a graft copolymer composition having a polymeric polyether as one component, said process comprising:
   a. adding and mixing more than an equivalent of an aliphatic polyacetal resin having a structure —Cn—O— in the main chain skeleton wherein n is 1 to 4 with a vinyl polymer having a side chain selected from the group consisting of acrylic ester, methacrylic ester, maleic ester, fumaric ester, itaconic ester, fatty acid, alcohol, acetal and maleic anhydride.
   b. adding a Lewis acid selected from the group consisting of a halide metal wherein said metal is boron, aluminum, tin titanium, antimony or iron as a catalyst under agitation in the state of a uniform solution or suspension, and
   c. heating the reaction mixture.

2. The process of claim 1 conducted in the presence of an organic solvent.

* * * * *